United States Patent
Gordon et al.

(10) Patent No.: US 11,997,076 B2
(45) Date of Patent: May 28, 2024

(54) SYSTEMS AND METHODS FOR ESTABLISHING SECURE COMMUNICATION IN AN ELECTRIC POWER DISTRIBUTION SYSTEM

(71) Applicant: Schweitzer Engineering Laboratories, Inc., Pullman, WA (US)

(72) Inventors: Colin Gordon, Katy, TX (US); John W. Knapek, Bothell, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 295 days.

(21) Appl. No.: 17/001,896

(22) Filed: Aug. 25, 2020

(65) Prior Publication Data
US 2022/0070155 A1 Mar. 3, 2022

(51) Int. Cl.
*H04L 9/40* (2022.01)
*H04L 67/12* (2022.01)

(52) U.S. Cl.
CPC ........ *H04L 63/061* (2013.01); *H04L 63/0442* (2013.01); *H04L 63/0823* (2013.01); *H04L 67/12* (2013.01)

(58) Field of Classification Search
CPC ............... H04L 63/061; H04L 63/0442; H04L 63/0823; H04L 67/12; H04L 9/0838; H04L 9/30; H04L 9/006; H04L 9/3263; H04L 63/083; H04L 63/065; G06F 21/33
See application file for complete search history.

(56) References Cited

U.S. PATENT DOCUMENTS

| | | | |
|---|---|---|---|
| 7,729,276 B2 | 6/2010 | Akyol | |
| 8,718,281 B2* | 5/2014 | Mishra | H04L 9/0891 |
| | | | 713/160 |
| 2014/0280672 A1* | 9/2014 | Day | H04L 67/2842 |
| | | | 709/213 |
| 2019/0068361 A1* | 2/2019 | Ye | H04W 4/48 |
| 2019/0116183 A1* | 4/2019 | Hussain | H04L 63/061 |
| 2019/0173860 A1 | 6/2019 | Sankaran | |
| 2019/0191307 A1* | 6/2019 | Sheng | H04L 63/065 |
| 2019/0342101 A1 | 11/2019 | Hayes | |
| 2020/0106719 A1 | 4/2020 | Acharya | |
| 2020/0120134 A1* | 4/2020 | Hill | H04L 63/0485 |
| 2021/0067329 A1* | 3/2021 | Coyle | H04L 63/065 |

(Continued)

OTHER PUBLICATIONS

Mr. Anand G S et al., Linux Based Implemented of MACSec Key Agreement (MKA), 2012, pp. 29-34. (Year: 2012).*

(Continued)

*Primary Examiner* — Luu T Pham
*Assistant Examiner* — Canh Le
(74) *Attorney, Agent, or Firm* — Fletcher Yoder, P.C.

(57) ABSTRACT

A system includes an intelligent electronic device (IED) configured to perform operations that include receiving a first user input and deriving a first connectivity association key (CAK) based on the first user input. The system also includes a gateway configured to perform operations that include receiving a second user input, deriving a second CAK based on the second user input, identifying the first CAK of the IED, establishing an adoption link with the IED based on a match between the first CAK and the second CAK, generating a third CAK, and distributing a copy of the third CAK to the IED via the adoption link to establish a MKA connectivity association with the IED.

20 Claims, 6 Drawing Sheets

(56) References Cited

U.S. PATENT DOCUMENTS

2021/0288716 A1\* 9/2021 Kudchadkar ........ H04B 10/116
2021/0297416 A1\* 9/2021 Gavraskar ............. H04L 67/145

OTHER PUBLICATIONS

Ju-Ho Choi et al., "MACsec Extension over Software-Defined Networks for In-Vehicle Secure Communication," 2018, pp. 180-185. (Year: 2018).\*

\* cited by examiner

SYSTEMS AND METHODS FOR ESTABLISHING SECURE COMMUNICATION IN AN ELECTRIC POWER DISTRIBUTION SYSTEM

BACKGROUND

This disclosure relates to establishing a secure communication link between different components of an electric power distribution system to enable data to be transmitted securely between the components.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system during operation of the electric power distribution system. For example, the IED may receive and/or transmit a signal and/or data in order to perform a functionality. Indeed, the IED may enable a user to control operation of various components of the electric power distribution system more easily, such as via a remote device. Unfortunately, it may be difficult to establish a secure communication link between the IED and other components of the electric power distribution system to enable the components to securely communicate with one another.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a system includes an intelligent electronic device (IED) configured to perform operations that include receiving a first user input and deriving a first connectivity association key (CAK) based on the first user input. The system also includes a gateway configured to perform operations that include receiving a second user input, deriving a second CAK based on the second user input, identifying the first CAK of the IED, establishing an adoption link with the IED based on a match between the first CAK and the second CAK, generating a third CAK, and distributing a copy of the third CAK to the IED via the adoption link to establish a Media Access Control security key agreement (MKA) association with the IED In an embodiment, a controller of an electric power distribution system includes a non-transitory computer readable medium comprising instructions that, when executed by processing circuitry, are configured to cause the processing circuitry to perform operations that include comparing a first connectivity association key (CAK) with a second CAK of an intelligent electronic device (IED) of the electric power distribution system, establishing an adoption association with the IED based on a match between the first CAK and the second CAK, generating a third CAK, distributing a copy of the third CAK to the IED via the adoption association, and establishing a Media Access Control security key agreement (MKA) connectivity association with the IED based on the IED possessing the copy of the third CAK.

In an embodiment, an intelligent electronic device (IED) of an electric power distribution system includes processing circuitry and a memory having instructions that, when executed by the processing circuitry, are configured to cause the processing circuitry to perform operations that include receiving a user input, deriving a first connectivity association key (CAK) based on the user input, broadcasting the first CAK, establishing an adoption link with an additional component of the electric power distribution system based on broadcasting of the first CAK, and receiving a copy of a second CAK from the gateway via the adoption link to establish a Media Access Control security key agreement (MKA) connectivity association with the gateway. The additional component of the electric power distribution system includes a gateway, an additional IED, or both.

DETAILED DESCRIPTION

Figure 1:
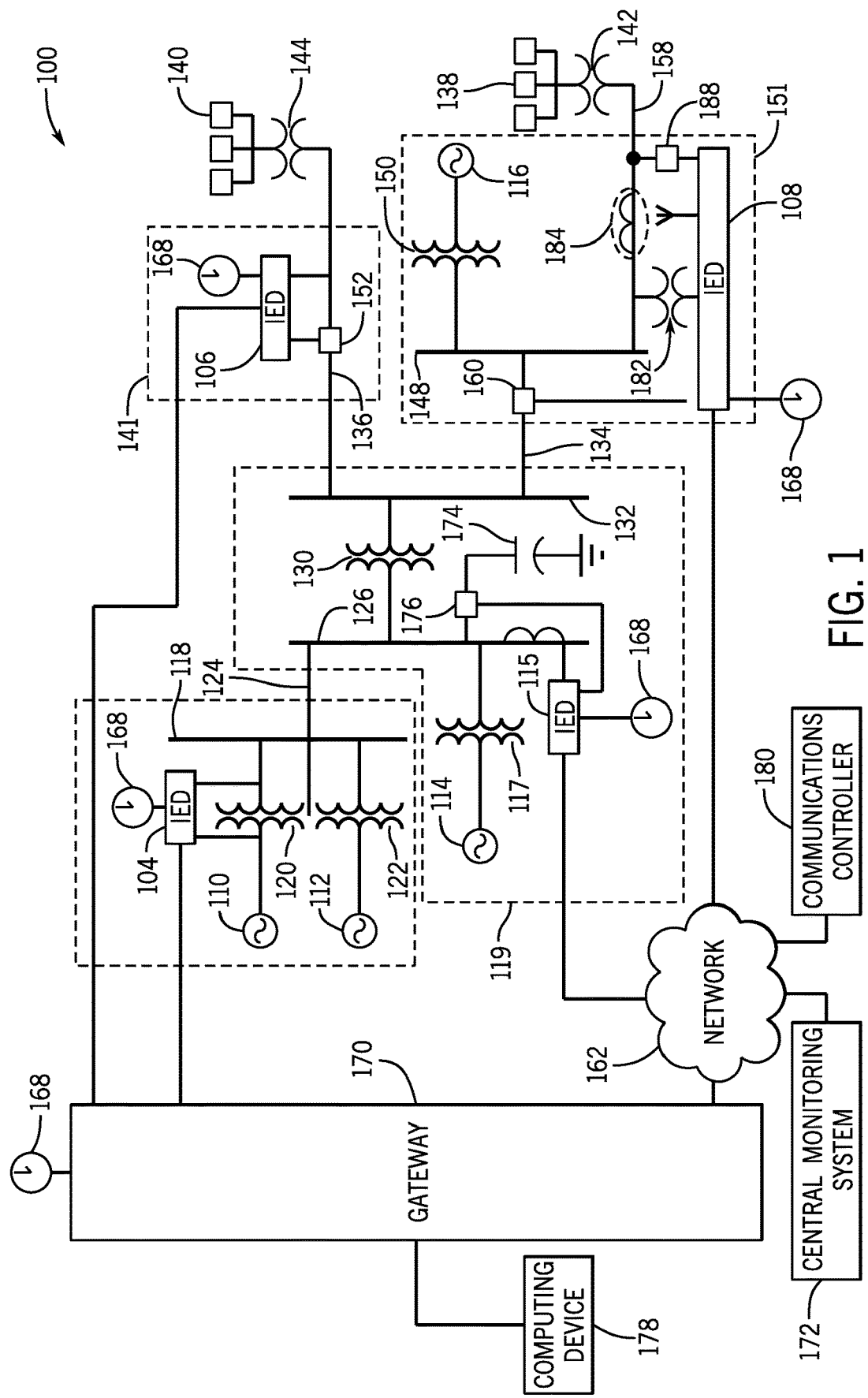
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Furthermore, some depictions of logic circuitry have been described via this disclosure. It should be understood that logically-equivalent circuitry may be used herein to implement the systems and methods described. For example, a logical XOR gate may be replaced via a logically equivalent combination of NOT gates, AND gates, Inverse NOT gates, OR gates, NAND gates, NOR gates, or the like.

Embodiments of the present disclosure are directed to establishing a communication link between components of an electric power distribution system. Intelligent electronic devices (IEDs) may be used to control certain devices and to perform certain operations of the electric power distribution system. For example, an IED may be a relay that enables or blocks electrical power to flow between other components of the electric power distribution system. The IED may, for instance, receive a control signal from a computing device (e.g., based on a user input), and the IED may operate based on the control signal. Furthermore, the IED may transmit data, such as operating information, to the computing device to enable visualization of the operation of the electric power distribution system and/or to transmit data to other components of the electric power distribution system to control operation of the other components. In this way, the IED may enable greater control over certain aspects of the electric power distribution system.

This disclosure provides for the secure and efficient establishment of a secure communication link. The techniques described herein may be in contrast to previous approaches to establish a communication link, as the previous approaches may be complex and may require a user to perform a series of procedures, such as modifying settings, verifying protocols, troubleshooting, or otherwise configuring the computing device, the IED, a network, or any other component in order to enable the IED to communicate with another component. To mitigate these concerns, embodiments of the present disclosure relate to a process for establishing a secure communication link between an IED and another component in a more simplified approach. In particular, the process is associated with using Media Access Control security (MACsec) to transfer data securely between the IED and another component. MACsec is established via a MACsec key agreement (MKA) protocol that enables data transfer via MACsec. Initiation of the MKA protocol includes inputting respective passcodes or passwords into the IED and the other component. Based on a match between the inputted passcodes, the IED and the other component may automatically perform procedures to establish MACsec and enable secure data transfer between the computing device and the IED. In this manner, the process discussed herein simplifies establishing the secure communication link between the IED and the other component. Further, although the present disclosure primarily focuses on communicatively coupling the IED with a computing device, the techniques described herein may also communicatively couple the IED with another suitable component, such as another IED.

With this in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna, a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A gateway 170, such as a network gateway, may be in communication with the IEDs 104, 106, 108, 115. The IEDs 104, 106, 108 115 may be remote from the gateway 170 and may communicate over various media. For instance, the gateway 170 may be directly in communication with the IEDs 104, 106 and may be in communication with the IEDs 108, 115 via the communications network 162. The gateway 170 may enable or block data flow between any of the IEDs 104, 106, 108, 115 and another component communicatively coupled to the gateway 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the gateway 170 and/or to send data, such as a user input, to the electric power distribution system 100 via the gateway 170. Thus, the gateway 170 may enable or block operation of the electric power distribution system 100 via the computing device 178. In some embodiments, some of the IEDs 104, 106, 108, 115 may also be in communication with one another. As a result, the IEDs 104, 106, 108, 115 may transmit data with one another to perform various functionalities. For instance, the computing device 178 may transmit data to one of the IEDs 104, 106, 108, 115, which may cause data to be transmitted to another one of the IEDs 104, 106, 108, 115.

A communications controller 180 may interface with equipment in the communications network 162 to create a software-defined network (SDN) that facilitates communication between the gateway 170, the IEDs 108, 115, and/or the central monitoring system 172. In various embodiments, the communications controller 180 may interface with a control plane (not shown) in the communications network 162. Using the control plane, the communications controller 180 may direct the flow of data within the communications network 162.

The communications controller 180 may receive information from multiple devices in the communications network 162 regarding transmission of data. In embodiments in which the communications network 162 includes fiber optic communication links, the data collected by the communications controller 180 may include reflection characteristics, attenuation characteristics, signal-to-noise ratio characteristics, harmonic characteristics, packet loss statics, and the like. In embodiments in which the communications network 162 includes electrical communication links, the data collected by the communications controller 180 may include voltage measurements, signal-to-noise ratio characteristics, packet loss statics, and the like. In some embodiments, the communications network 162 may include both electrical and optical transmission media. The information collected by the communications controller 180 may be used to assess a likelihood of an issue, to generate information about precursors to an issue, and to identify a root cause of an issue. The communications controller 180 may associate information regarding a status of various communication devices and communication links to assess a likelihood of an issue. Such associations may be utilized to generate information about the precursors to an issue and/or to identify root cause(s) of an issue.

As discussed above, it may be time-consuming, complex, or otherwise difficult to establish a secure communication between an IED and another component (e.g., the computing device 178) of the electric distribution system 100 to enable data transfer between the IED and the other component. In the illustrated electric power distribution system 100, the gateway 170 may be used to simplify the process for enabling the computing device 178 to securely communicate with any of the IEDs 104, 106, 108, 115. As an example, MKA protocol may be used to enable data transfer between the gateway 170 and the IEDs 104, 106, 108, 115 via MACsec. Upon initiation, the MKA protocol may be performed automatically by the gateway 170 and the IEDs 104, 106, 108, 115, instead of by a user, to establish the communication link and to enable the IEDs 104, 106, 108, 115 to communicate securely with the gateway 170. The gateway 170 may then enable data transfer between the IEDs 104, 106, 108, 115 and the computing device 178 communicatively coupled to the gateway 170 via the communication link. Automatic performance of the MKA protocol may reduce or limit a number of tasks to be performed by the user, thereby simplifying establishment of the secure communication link that enables secure data transfer between the computing device 178 and the IEDs 104, 106, 108, 115.

Figure 2:
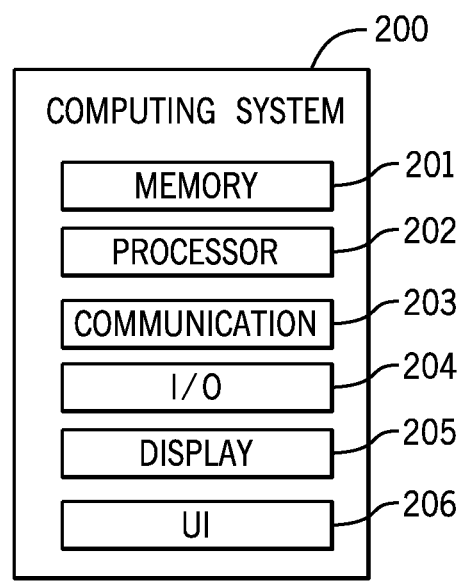
FIG. 2 is a schematic diagram of an embodiment of a computing system that may be incorporated in a component of an electric power distribution system, in accordance with an embodiment of the present disclosure.

FIG. 2 is a schematic diagram of an embodiment of a computing system 200 that may be incorporated within a component of the electric power distribution system 100, such as in any of the IEDs 104, 106, 108, 115, the gateway 170, and/or the computing device 178. The computing system 200 may include a memory 201 and a processor or processing circuitry 202. The memory 201 may include a non-transitory computer-readable medium that may store instructions that, when executed by the processor 202, may cause the processor 202 to perform various methods or processes described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the gateway 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the gateway 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the gateway 170 and/or to complete setup of a MACsec system, as described herein.

Figure 3:
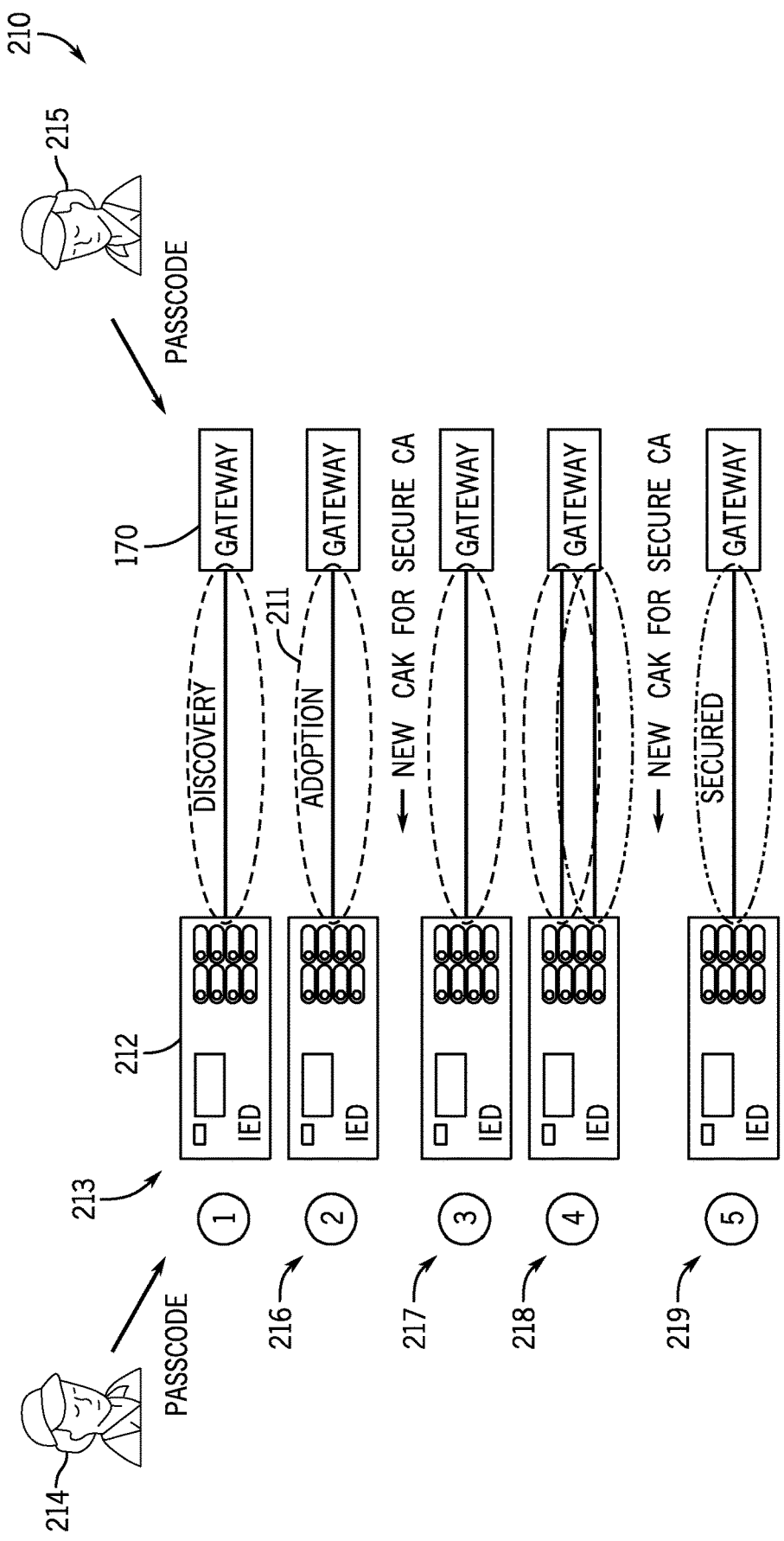
FIG. 3 is a schematic diagram of an embodiment of a procedure for establishing a secure communication link between a gateway device and an intelligent electronic device (IED), in accordance with an embodiment of the present disclosure

FIG. 3 is a schematic diagram 210 illustrating the procedure for establishing a MACsec communication link between an IED 212 and the gateway 170. In the illustrated embodiment, at a first block 213, to initiate discovery of a possible adoption link between the IED 212 and the gateway 170, a first user 214 inputs a first passcode or other suitable input to the IED 212, and a second user 215 inputs a second passcode or other suitable input to the gateway 170. In some embodiments, the first user 214 and the second user 215 are the same user. For instance, a single user may communicatively couple the computing device 178 to the IED 212 (e.g., via a physical cable) to input the first passcode, and the same user may communicatively couple the computing device 178 (e.g., via the physical cable) to the gateway 170 to input the second passcode. In additional embodiments, the first user 214 and the second user 215 may be different users. As an example, the second user 215 may be a remote user that may remotely input the second passcode to the gateway 170 and may communicate with the first user 214 to prompt the first user 214 to input the corresponding first passcode to the IED 212. In any case, in response to receipt of the respective inputs, the IED 212 and the gateway 170 may derive respective connectivity association keys (CAKs), such as a first CAK and a second CAK.

In response to a match between the respective CAKs derived by the IED 212 and the gateway 170, at a second block 216, an adoption link 211 may be established between the IED 212 and the gateway 170. The adoption link 211 may enable an exchange of keys for establishing the MKA connectivity association. For example, at a third block 217, the gateway 170 may generate (e.g., randomly generate) a new CAK (e.g., a third CAK) and distribute a copy of the new CAK to the IED 212 via the adoption link 211. Therefore, both the IED 212 and the gateway 170 may possess matching new CAKs, and the MKA connectivity association may be established in response. The MKA connectivity association may remain established so long as the IED 212 and the gateway 170 possess matching new CAKs. In some embodiments, the CAK for establishing the MKA connectivity association may be changed or updated at a particular frequency, such as at particular time intervals, in order to block unwanted possession or derivation of the CAK (e.g., by an unintended computing device). By way of example, the gateway 170 may generate a subsequent CAK and may distribute a copy of the subsequent CAK to the IED 212 such that the IED 212 possesses matching subsequent CAKs to maintain the MKA connectivity association.

At a fourth block 218, in response to confirmation that the IED 212 possesses the new CAK, the gateway 170 may generate an SAK and distribute a copy of the SAK to the IED 212 via the MKA connectivity association. After distribution of the copy of the SAK, a MACsec communication link may be established for transmitting data. Thus, at a fifth block 219, the IED 212 and the gateway 170 may each use matching SAKs to encrypt and decrypt data transferred via the MACsec communication link to enable secure data exchange between the IED 212 and the gateway 170 (e.g., by blocking unwanted decryption of data by an unintended third party). In this manner, the initial CAKs derived via the respective passcodes may be used for establishing the adoption link 211, subsequent CAKs may be used for establishing a MKA connectivity association, and SAKs may be used for enabling secure data exchange via the MKA connectivity association.

In some cases, it may be desirable to incorporate an additional security measure to communicatively couple the gateway 170 with an IED. For example, the security measure may include an additional input that verifies that the MKA connectivity association is to be established between the IED and the gateway 170. In some embodiments, the additional input may include physically interacting with a feature of the IED in order to physically confirm establishment of the MKA connectivity association. That is, the user may be physically adjacent to the IED in order to transmit the additional input to verify establishment of the MKA connectivity association and may not be able to transmit the additional input remotely, thereby blocking unwanted (e.g., remote) attempts to communicatively couple to the IED FIGS. 4-6 below illustrate various methods or procedures to establish an MKA connectivity association and/or a MACsec communication link, such as using procedures similarly described above with respect to FIG. 3. In some embodiments, each of the methods may be performed by a single respective component, such as by the computing system 200 (e.g., the processor 202) of the gateway 170 or the computing system 200 (e.g., the processor 202) of one of the IEDs 104, 106, 108, 115. In additional embodiments, multiple components may perform the procedures for a single one of the methods. It should also be noted that additional procedures may be performed with respect to the described methods. Additionally, certain procedures of the depicted methods may be removed, modified, and/or performed in a different order. Further still, the procedures of any of the respective methods may be performed in parallel with one another, such at the same time and/or in response to one another.

Figure 4:
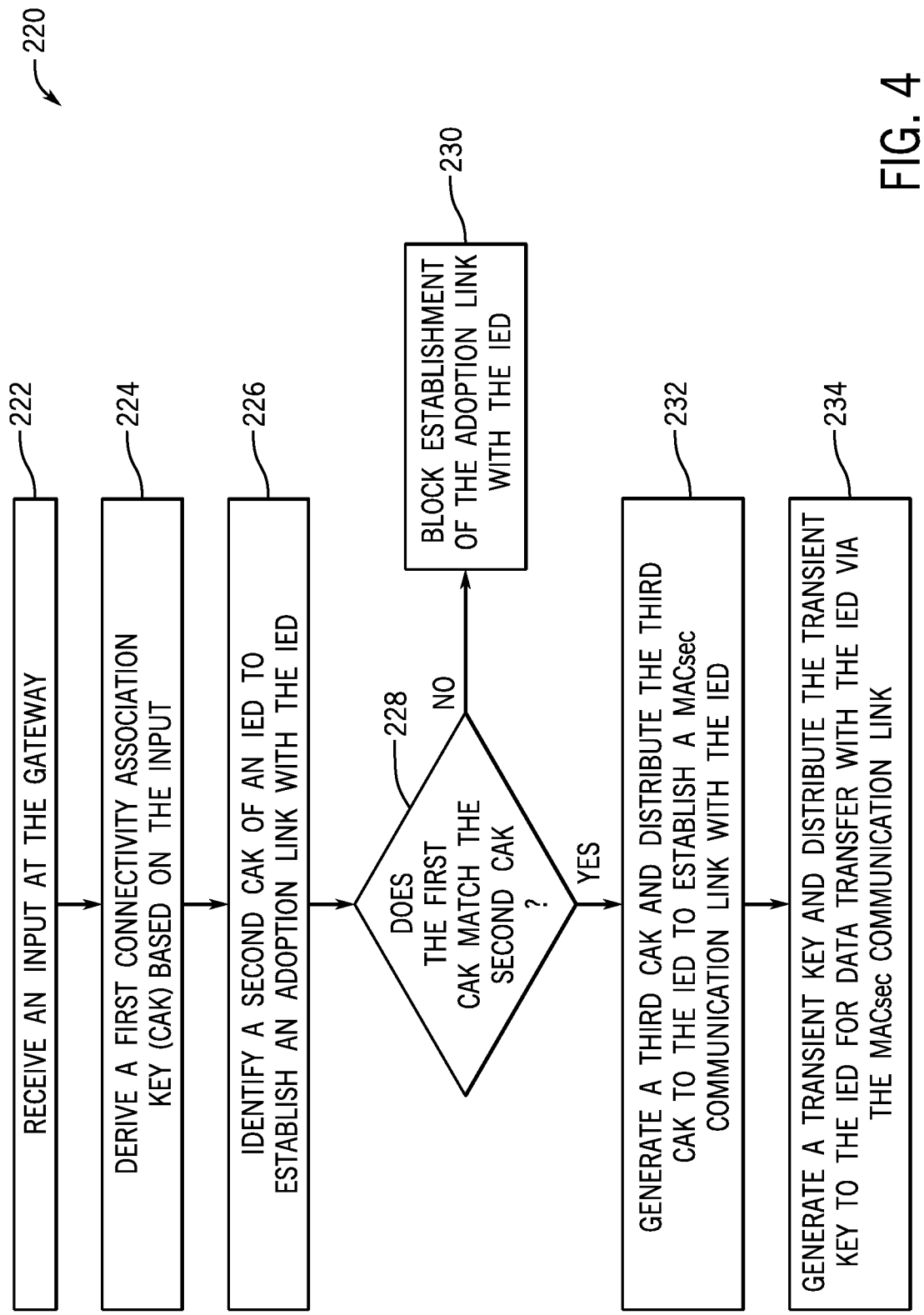
FIG. 4 is a flowchart of an embodiment of a method or process for establishing a secure communication link between a gateway device and an IED, in accordance with an embodiment of the present disclosure.

FIG. 4 is a flowchart of a method or process 220 for establishing a MACsec communication link between a gateway, such as the gateway 170, and an IED, such as any of the IEDs 104, 106, 108, 115. The method 220 is described from the perspective of the gateway 170 to perform the described procedures. The method 220 may be performed prior to there being an existing secure communication link between the gateway 170 and the IED 104, 106, 108, 115, such as during installation of the gateway 170 and/or during installation of the IED 104, 106, 108, 115. In particular, the method 220 illustrates procedures that may be performed by the gateway 170 to establish the MACsec communication link. In some embodiments, the gateway 170 may initiate and/or perform the procedures of the method 220 automatically (e.g., with little or no guidance from the user).

At block 222, the gateway 170 may receive an input, such as a first input. In some embodiments, the first input may include a passcode or password entered via the computing device 178 communicatively coupled to the gateway 170. By way of example, the first input may include a first user input entered manually by a user interacting with the computing device 178. At block 224, the gateway 170 (e.g., the processor 202 of the gateway 170) derives a first connectivity association key (CAK) based on the first input. For instance, the passcode may include various characters and/or symbols, and the gateway 170 may derive the first CAK based on such characters and/or symbols.

At block 226, the gateway 170 identifies a second CAK of the IED 104, 106, 108, 115 to establish an adoption link with the IED 104, 106, 108, 115. As an example, the IED 104, 106, 108, 115 may have received an additional input, such as a second input or a second user input, by a user (e.g., via the computing device 178 or a different computing device), and the IED 104, 106, 108, 115 may derive the second CAK using a similar technique in which the gateway 170 derives the first CAK. The IED 104, 106, 108, 115 may broadcast the second CAK, and the gateway 170 may therefore be able to view the second CAK derived by the IED 104, 106, 108, 115 to determine whether the adoption link is to be established. The adoption link may enable subsequent exchanges of keys (e.g., subsequent CAKs and SAKs) that enable establishment of the MKA connectivity association, which may be a secure, long-lasting communication link that will enable data transfer between the IED 104, 106, 108, 115 and the gateway 170 and therefore between the IED 104, 106, 108, 115 and the computing device 178.

At block 228, the gateway 170 determines whether the first CAK, which was derived by the gateway 170, matches the second CAK, which was derived by the IED 104, 106, 108, 115. A match between the first CAK and the second CAK may indicate that the first input received by the gateway 170 matches the second input received by the IED 104, 106, 108, 115. Indeed, the match between the first CAK and the second CAK may verify that the respective inputs received by the gateway 170 and the IED 104, 106, 108, 115 are intended to establish the adoption link and the MKA connectivity association between the gateway 170 and the IED 104, 106, 108, 115.

For instance, at block 230, based on a determination of a mismatch between the first CAK and the second CAK, the gateway 170 may block establishment of the adoption link with the IED 104, 106, 108, 115 and/or the gateway 170 may be blocked by the IED 104, 106, 108, 115 from establishing the adoption link. In any case, the gateway 170 may not perform subsequent procedures of the method 220 to establish a secure connection. Indeed, a mismatch between the first CAK and the second CAK may indicate a mismatch between the respective inputs received by the gateway 170 and the IED 104, 106, 108, 115, thereby indicating that the respective inputs do not successfully verify an intention to establish the MKA connectivity association between the gateway 170 and the IED 104, 106, 108, 115. For example, a difference in a single character or symbol between respective passcodes may cause the gateway 170 to block establishment of the adoption link.

At block 232, in response to a determination that there is a match between the first CAK and the second CAK, the gateway 170 may generate a third CAK in order to establish a suitable long-term MKA connectivity association with the IED 104, 106, 108, 115. By way of example, the first CAK and/or the second CAK may be temporary or transient CAKs (e.g., for a one-time use) that are used to establish the adoption link to enable a subsequent exchange of new CAKs, but not to establish the MKA connectivity association to enable further data transfer between the gateway 170 and the IED 104, 106, 108, 115. In some embodiments, the gateway 170 may randomly generate the third CAK (e.g., via a random number generator or a pseudorandom number generator). That is, the gateway 170 may not derive the third CAK from a user input or other received data. As such, the gateway 170 may block another device (e.g., an intruding computing device) from deriving the same third CAK (e.g., based on the first or second input). The gateway 170 may then distribute a copy of the third CAK to the IED 104, 106, 108, 115 via the adoption link established with respect to block 228. As a result, the IED 104, 106, 108, 115 may also possess the matching third CAK generated via the gateway 170. By confirming that the IED 104, 106, 108, 115 possesses the copy of the third CAK, the gateway 170 may establish the MKA connectivity association.

The MKA connectivity association may modify certain settings, such as protocols, security settings, communications, and so forth, of the gateway 170 and/or the IED 104, 106, 108, 115 to enable secure data transfer. In other examples, the gateway 170 may identify further parameters, such as a MAC address or port, associated with the IED 104, 106, 108, 115 to determine whether the MKA connectivity association is to be established with the IED 104, 106, 108, 115. As an example, after the adoption link is established between the gateway 170 and the IED 104, 106, 108, 115 (e.g., after block 226), the gateway 170 may identify the parameters of the IED 104, 106, 108, 115. During the establishment of the MKA connectivity association, the gateway 170 may determine whether the IED 104, 106, 108, 115 possesses the copy of the third CAK and whether the parameters of the IED 104, 106, 108, 115 match with the previously identified parameters in order to verify that the MKA connectivity association is to be established between the gateway 170 and the IED 104, 106, 108, 115. In other words, the gateway 170 may determine whether the IED 104, 106, 108, 115 possesses the copy of the third CAK generated by the gateway 170 and also whether the IED 104, 106, 108, 115 includes expected parameters to determine whether the MKA connectivity association is to be established.

At block 234, in response to confirmation that the IED 104, 106, 108, 115 possesses the copy of the third CAK generated by the gateway 170, the gateway 170 may generate a secure association key (SAK) and distribute a copy of the SAK to the IED 104, 106, 108, 115 via the MKA connectivity association established with respect to block 232. For example, the gateway 170 may randomly generate the SAK and/or may generate the SAK via the third CAK. Distribution of the copy of the SAK may establish a MACsec communication link that may include two communication channels: a first communication channel to enable data transfer from the gateway 170 to the IED 104, 106, 108, 115 and a second communication channel to enable data transfer from the IED 104, 106, 108, 115 to the gateway 170. In this manner, the gateway 170 may enable further data and/or keys to be exchanged with the IED 104, 106, 108, 115 in response to confirmation that the IED 104, 106, 108, 115 possesses the copy of the third CAK. Additionally, the gateway 170 may block data and/or keys to be exchanged with the IED 104, 106, 108, 115 in response to a determination that the IED 104, 106, 108, 115 does not possess the copy of the third CAK (e.g., by removing or disconnecting the MKA connectivity association) in order to block data from being exchanged between the gateway 170 and an unintended entity.

The gateway 170 may use the SAK for encrypting data that is sent via the MACsec communication link (e.g., via the first communication channel of the MACsec communication link), the IED 104, 106, 108, 115 may use the copy of the SAK to decrypt the data received from the gateway 170, and vice versa. For instance, the gateway 170 may receive data from the computing device 178, and the gateway 170 may use the SAK to encrypt such data before transmitting the data to the IED 104, 106, 108, 115 (e.g., via the first communication channel). Further, the gateway 170 may receive encrypted data from the IED 104, 106, 108, 115 (e.g., via the second communication channel of the MACsec communication link), and the gateway 170 may use the SAK to decrypt the data before transmitting the data to the computing device 178.

In some embodiments, the SAK may be transient and new SAKs may be generated at a particular frequency. As an example, a new SAK may be generated after a particular time has elapsed, after a particular quantity of data has been transferred between the gateway 170 and the IED 104, 106, 108, 115, after a new connection has been established between the gateway 170 and another computing device 178, at another suitable frequency, or any combination thereof. The gateway 170 may distribute the new SAK to the IED 104, 106, 108, 115 via the same MKA connectivity association established with respect to block 232 so long as the IED 104, 106, 108, 115 possesses a copy of the third CAK generated by the gateway 170. After generating the new SAK, the gateway 170 may use the new SAK instead of a previously used SAK for encrypting and/or decrypting data transferred between the gateway 170 and the IED 104, 106, 108, 115. In this manner, the SAK may continuously update at a particular frequency to block unwanted possession of the SAK by an unintended device.

Figure 5:
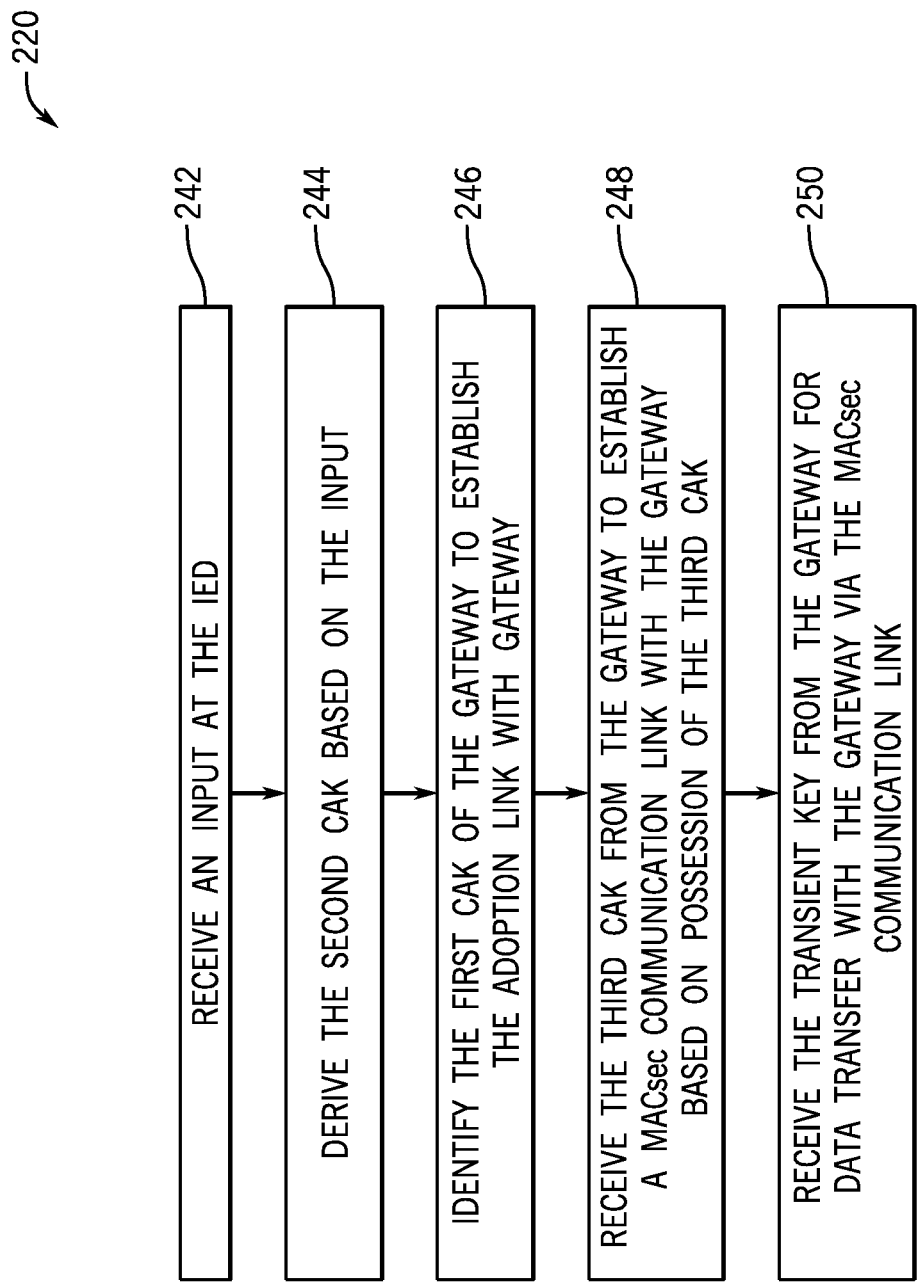
FIG. 5 is a flowchart of an embodiment of a method or process for establishing a secure communication link between a gateway device and an IED, in accordance with an embodiment of the present disclosure.

FIG. 5 is a flowchart of a method or process 240 for establishing a MACsec communication link between the gateway 170 and the IED 104, 106, 108, 115. The method 240 is described from the perspective of the IED 104, 106, 108, 115 to perform the described procedures. Indeed, the IED 104, 106, 108, 115 may perform the method 240 based on the gateway 170 performing the method 220 described with respect to FIG. 4. That is, the IED 104, 106, 108, 115 may perform the procedures of the method 240 while the gateway 170 performs the procedures of the method 220 as described above, such as during and/or in response to the performance of any suitable procedure described with respect to blocks 222-234. In some embodiments, the IED 104, 106, 108, 115 may initiate and/or perform the procedures of the method 240 automatically, such as in parallel with the initiation of the method 220 by the gateway 170.

At block 242, the IED 104, 106, 108, 115 may receive an input, such as a second input, that is separate from the first input received by the gateway 170 with respect to block 222 described above. The second input may include a passcode or password entered via a computing device, such as the computing device 178. For instance, after the first input has been transmitted to the gateway 170, the computing device 178 may be decoupled from the gateway 170 and may be communicatively coupled to the IED 104, 106, 108, 115 instead in order to enable the user to transmit the second input to the IED 104, 106, 108, 115.

At block 244, the IED 104, 106, 108, 115 derives the second CAK based on the second input. As noted above, the IED 104, 106, 108, 115 may derive the second CAK in the same manner or using the same technique in which the gateway 170 derives the first CAK, such as based on characters and/or symbols of the second input. The IED 104, 106, 108, 115 may broadcast the second CAK such that the gateway 170 may be able to view the second CAK. Similarly, the gateway 170 may broadcast the first CAK to enable the IED 104, 106, 108, 115 to view the first CAK. At block 246, based on the second CAK of the IED 104, 106, 108, 115 matching with the first CAK of the gateway 170, the IED 104, 106, 108, 115 may establish the adoption link with the gateway 170. That is, in response to a determination that the first CAK and the second CAK match with one another, the IED 104, 106, 108, 115 and the gateway 170 may establish the adoption link to enable a subsequent exchange of keys. However, based on a mismatch between the first CAK of the gateway 170 and the second CAK of the IED 104, 106, 108, 115, no adoption link may be established between the IED 104, 106, 108, 115 and the gateway 170. For example, the IED 104, 106, 108, 115, the gateway 170, or both, may block establishment of the adoption link.

At block 248, the IED 104, 106, 108, 115 receives the copy of the third CAK from the gateway 170 to establish the MKA connectivity association in response to the gateway 170 determining that the second CAK broadcasted by the IED 104, 106, 108, 115 matches with the first CAK derived by the gateway 170. As mentioned above, the second CAK may be a temporary CAK used to establish the adoption link, and the third CAK may be a more long-lasting CAK used to establish the MKA connectivity association between the gateway 170 and the IED 104, 106, 108, 115. Indeed, the MKA connectivity association may be maintained so long as the IED 104, 106, 108, 115 possesses the copy of the third CAK.

At block 250, the IED 104, 106, 108, 115 receives the copy of the SAK from the gateway via the MKA connectivity association, and a MACsec communication link may be established as a result. The IED 104, 106, 108, 115 may use the copy of the SAK to encrypt data to be sent to the gateway 170 via the MACsec communication link and/or to decrypt data received from the gateway 170 via the MACsec communication link. Additionally or alternatively, the IED 104, 106, 108, 115 may use the copy of the SAK to communicate with another one of the IEDs 104, 106, 108, 115 (e.g., via another MACsec communication link established between the IEDs 104, 106, 108, 115). Indeed, a first IED may use a first copy of the SAK (e.g., as received from the gateway 170) to encrypt data and transmit encrypted data to a second IED. The second IED may use a second copy of the SAK (e.g., as received from the gateway 170) to decrypt the encrypted data received from the first IED. In certain embodiments, the gateway 170 may generate a new SAK at a particular frequency for distribution to the IED 104, 106, 108, 115. Thus, the IED 104, 106, 108, 115 may receive a copy of the new SAK at the particular frequency, and the IED 104, 106, 108, 115 may use the copy of the new SAK instead of a copy of a previously used SAK for encrypting and/or decrypting data transferred between the IED 104, 106, 108, 115 and the gateway 170 via the MACsec communication link.

Figure 6:
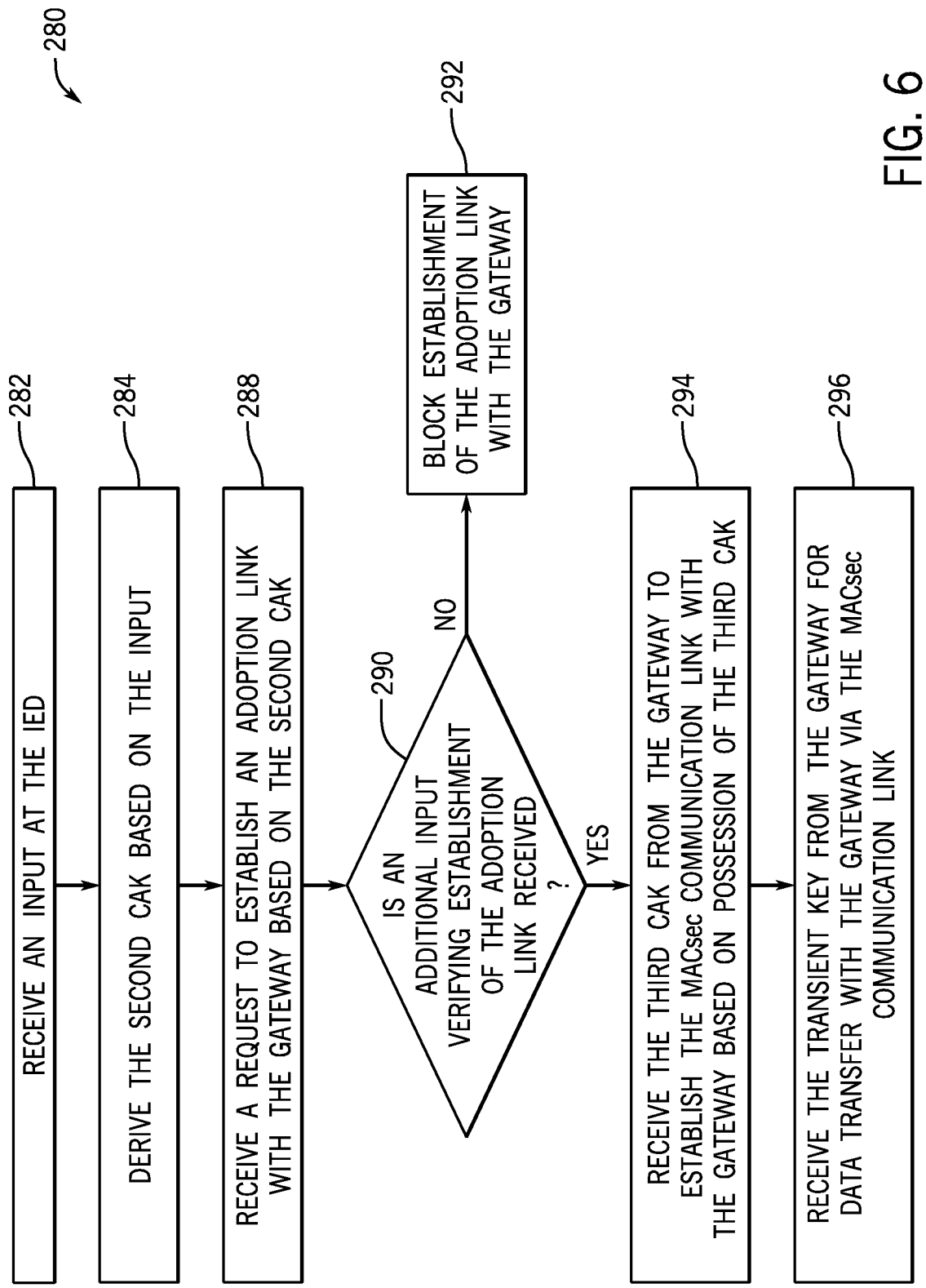
FIG. 6 is a flowchart of an embodiment of a method or process for establishing a secure communication link between a gateway device and an IED, in accordance with an embodiment of the present disclosure.

FIG. 6 is a flowchart of a method or process 280 for establishing a MACsec communication link between the gateway 170 and the IED 104, 106, 108, 115. The method 280 may be similar to the method 240 described with respect to FIG. 5, but may include a procedure to physically verify that the adoption link and/or the MKA connectivity association is to be established. At block 282, the IED 104, 106, 108, 115 may receive an input, such as a passcode or password. At block 284, the IED 104, 106, 108, 115 may derive the second CAK based on the received input. The gateway 170 may be able to view the second CAK derived by the IED 104, 106, 108, 115 and may transmit a request to establish an adoption link with the IED 104, 106, 108, 115 based on the second CAK matching with the first CAK of the gateway 170 (e.g., as a result of the input received by the IED 104, 106, 108, 115 matching the input received by the gateway 170).

Thus, at block 288, the IED 104, 106, 108, 115 may receive the request from the gateway 170. At block 290, the IED 104, 106, 108, 115 determines whether an additional input that verifies establishment of the adoption link is received. In certain embodiments, the request may cause the IED 104, 106, 108, 115 to output a notification that the additional input is to be received in order to establish the adoption link. For instance, the IED 104, 106, 108, 115 may include a user interface that presents a visualization of the request. Additionally, the IED 104, 106, 108, 115 may present a different visual output (e.g., a light), an audio output (e.g., a sound), a notification to a computing device (e.g., the computing device 178), or another suitable notification to request for the additional input. In some embodiments, the additional input may include a physical interaction with a feature (e.g., a push of a button, an interaction with a touchscreen, a rotation of a dial, a positioning of a switch) of the IED 104, 106, 108, 115. By way of example, the IED 104, 106, 108, 115 may include the UI 206 (FIG. 2) with which a user may interact to transmit the additional input.

At block 292, the IED 104, 106, 108, 115 may block the establishment of the adoption link with the gateway 170 in response to a determination that the additional input is not received. As an example, the IED 104, 106, 108, 115 may block the establishment of the adoption link if the additional input is not received within a threshold time after receiving the request from the gateway 170. To this end, after the request to establish the adoption link is received from the gateway 170 with respect to block 288, a sensor (e.g., a clock) of the IED 104, 106, 108, 115 may determine an amount of time that has elapsed since the request was received. The IED 104, 106, 108, 115 may monitor the amount of time indicated by the sensor, and the IED 104, 106, 108, 115 may block establishment of the adoption link in response to not receiving the additional input prior to the amount of time determined by the sensor exceeding the threshold time.

In some embodiments, the IED 104, 106, 108, 115 may block establishment of the adoption link with the gateway 170 by indicating to the gateway 170 that the adoption link is not to be established. That is, the signal may block the gateway 170 from generating an additional key (e.g., the third CAK key) for distribution to the IED 104, 106, 108, 115. In additional embodiments, the IED 104, 106, 108, 115 may block establishment of the adoption link by blocking receipt of the additional key generated by the gateway 170. In any case, the IED 104, 106, 108, 115 does not receive a subsequent CAK key unless the additional input is received. As a result, the IED 104, 106, 108, 115 and the gateway 170 do not possess matching copies of the CAK key that would establish the long-lasting MKA connectivity association for further data transfer.

At block 294, in response to a determination that the additional input is received to verify establishment of the adoption link, the IED 104, 106, 108, 115 may receive the copy of the third CAK generated by the gateway 170. Thus, the IED 104, 106, 108, 115 and the gateway 170 possess matching copies of the third CAK to establish the MKA connectivity association that enables further data and key transfer between the gateway 170 and the IED 104, 106, 108, 115. Indeed, at block 296, the IED 104, 106, 108, 115 may receive the copy of the SAK from the gateway 170 via the MKA connectivity association for encrypting and/or decrypting data via a corresponding MACsec communication link.

In certain embodiments, the IED 104, 106, 108, 115 may request for the additional input to establish the adoption link a single time, such as during an installation procedure and/or a configuration procedure to communicatively couple the IED 104, 106, 108, 115 to the gateway 170. That is, after the IED 104, 106, 108, 115 has received the additional input, the adoption link may be maintained indefinitely, such as without having to request for another input to verify the adoption link at a subsequent time. In some examples, the IED 104, 106, 108, 115 may request for inputs at a particular frequency in order to maintain the adoption link and the MKA connectivity association with the gateway 170. For instance, after the adoption link has been initially established between the IED 104, 106, 108, 115 and the gateway 170, the gateway 170 may transmit a subsequent request at a different time to maintain the adoption link. The subsequent request may cause the IED 104, 106, 108, 115 to prompt for another input, such as another physical interaction with the IED 104, 106, 108, 115, in order to verify that the adoption link is to be maintained. Indeed, if the IED 104, 106, 108, 115 does not receive another input in response to the subsequent request, the adoption link and the MKA connectivity association between the IED 104, 106, 108, 115 and the gateway 170 may be removed. As such, another adoption link and MKA connectivity association is to be established (e.g., via the method 280) to enable data transfer between the IED 104, 106, 108, 115 and the gateway 170.

In further embodiments, the request to establish the adoption link may be received without having the gateway 170 and the IED 104, 106, 108, 115 derive respective CAKs. For example, the gateway 170 and the IED 104, 106, 108, 115 may be paired or otherwise in communication with one another during manufacturing. As such, during initiation of the electric power distribution system 100, the gateway 170 may then automatically transmit the request to establish the adoption link with the IED 104, 106, 108, 115. Thus, the adoption link between the gateway 170 and the IED 104, 106, 108, 115 may be established via the additional input without having to initially enter respective inputs (e.g., to derive matching CAKs).

Although FIGS. 3-6 generally describe establishing a secure communication link between one of the IEDs 104, 106, 108, 115 and the gateway 170, in additional or alternative embodiments, the techniques described herein may be used to establish a secure communication link between two IEDs 104, 106, 108, 115. In other words, the MKA protocol and MACsec communication techniques described herein may be used to enable two IEDs 104, 106, 108, 115 to securely transmit data to one another. Indeed, one of the IEDs 104, 106, 108, 115 may generate the CAKs and/or the SAKs for distribution to another of the IEDs 104, 106, 108, 115, and copies of an SAK may be used to encrypt and decrypt data transferred between the IEDs 104, 106, 108, 115.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
an intelligent electronic device (IED) configured to perform operations comprising receiving a first user input and deriving a first connectivity association key (CAK) based on the first user input; and
a gateway configured to perform operations comprising:
receiving a second user input;
deriving a second CAK based on the second user input;
identifying the first CAK of the IED;
establishing an adoption link with the IED based on a match between the first CAK and the second CAK;
generating a third CAK; and
distributing a copy of the third CAK to the IED via the adoption link to establish a Media Access Control security key agreement (MKA) connectivity association with the IED.

2. The system of claim 1, wherein the gateway is configured to perform operations comprising:
generating a secure association key (SAK);
distributing a copy of the SAK to the IED via the MKA connectivity association to establish a MACsec communication link;
encrypting data via the SAK; and
transmitting the encrypted data to the IED via the MACsec communication link.

3. The system of claim 2, wherein the IED is configured to perform operations comprising:
receiving the copy of the SAK from the gateway;
receiving the encrypted data from the gateway; and
decrypting the encrypted data via the copy of the SAK received from the gateway.

4. The system of claim 1, wherein:
the gateway is configured to perform operations comprising transmitting a request to establish the adoption link with the IED based on the match between the first CAK and the second CAK;
the IED is configured to perform operations comprising receiving the request to establish the adoption link and receiving a third user input to verify establishment of the adoption link between the gateway and the IED; and
the gateway is configured to perform operations comprising establishing the adoption link based on the IED receiving the third user input.

5. The system of claim 4, wherein the third user input comprises a physical interaction with an interface of the IED, and the interface comprises a button, a touchscreen, a dial, a switch, or any combination thereof.

6. The system of claim 1, wherein the gateway is configured to perform operations comprising generating the third CAK via a random number generator or a pseudorandom number generator.

7. The system of claim 1, wherein the gateway is configured to perform operations comprising blocking establishment of the adoption link with the IED based on a mismatch between the first CAK and the second CAK.

8. The system of claim 1, wherein the IED comprises a relay, a controller, a meter, a computing platform, an input and output module, or any combination thereof.

9. The system of claim 1, wherein the gateway is communicatively coupled to a computing device, and the gateway is configured to perform operations comprising receiving the second user input from the computing device.

10. The system of claim 9, wherein the computing device comprises a first computing device, the IED is communicatively coupled to a second computing device, and the IED is configured to perform operations comprising receiving the first user input from the second computing device.

11. A controller of a gateway for an electric power distribution system, the controller comprising a non-transitory computer readable medium comprising instructions that, when executed by processing circuitry, are configured to cause the processing circuitry to perform operations comprising:
comparing a first connectivity association key (CAK) with a second CAK of an intelligent electronic device (IED) of the electric power distribution system;
establishing an adoption link with the IED based on a match between the first CAK and the second CAK;
generating a third CAK;
distributing a copy of the third CAK to the IED via the adoption link; and
establishing a Media Access Control security key agreement (MKA) connectivity association with the IED based on the IED possessing the copy of the third CAK.

12. The controller of claim 11, wherein the instructions, when executed by the processing circuitry, are configured to cause the processing circuitry to perform operations comprising:
transmitting a request to establish the adoption link with the IED based on the match between the first CAK and the second CAK; and
establishing the adoption link with the IED in response to the IED receiving a user input verifying establishment of the adoption link between the gateway and the IED based on the request to establish the adoption link.

13. The controller of claim 12, wherein the instructions, when executed by the processing circuitry, are configured to cause the processing circuitry to perform operations comprising blocking establishment of the adoption link with the IED in response to the IED not receiving the user input verifying establishment of the adoption link between the gateway and the IED based on the request to establish the adoption link.

14. The controller of claim 11, wherein the instructions, when executed by the processing circuitry, are configured to cause the processing circuitry to perform operations comprising:
generating a secure association key (SAK);
receiving first encrypted data from the IED; and
decrypting the first encrypted data via the SAK.

15. The controller of claim 14, wherein the instructions, when executed by the processing circuitry, are configured to cause the processing circuitry to perform operations comprising:
receiving data from a computing device communicatively coupled to the controller;
encrypting, via the SAK, the data received from the computing device; and
transmitting the data to the IED.

16. The controller of claim 14, wherein the SAK comprises a first SAK, and the instructions, when executed by the processing circuitry, are configured to cause the processing circuitry to perform operations comprising:
generating the first SAK at a first time;
distributing a copy of the first SAK to the IED via the MKA connectivity association to establish a MACsec communication link;
encrypting second encrypted data via the first SAK;

transmitting the second encrypted data to the IED via the MACsec communication link;
generating a second SAK at a second time;
distributing a copy of the second SAK to the IED via the MKA connectivity association;
encrypting third encrypted data via the second SAK; and
transmitting the third encrypted data to the IED via the MACsec communication link.

17. An intelligent electronic device (IED) for an electric power distribution system, the IED comprising:
processing circuitry; and
a memory comprising instructions that, when executed by the processing circuitry, are configured to cause the processing circuitry to perform operations comprising:
receiving a user input;
deriving a first connectivity association key (CAK) based on the user input;
broadcasting the first CAK;
establishing an adoption link with an additional component of the electric power distribution system based on broadcasting of the first CAK, wherein the additional component is a gateway, an IED, or both; and
receiving a copy of a second CAK from the additional component via the adoption link to establish a Media Access Control key agreement (MKA) communication link with the additional component.

18. The IED of claim 17, comprising an interface, wherein the user input comprises an interaction with the interface.

19. The IED of claim 17, wherein the instructions, when executed by the processing circuitry, are configured to cause the processing circuitry to perform operations comprising:
receiving a secure association key (SAK) from the additional component to establish a MACsec communication link;
receiving encrypted data from the additional component via the MACsec communication link; and
decrypting the encrypted data via the SAK.

20. The IED of claim 17, wherein the instructions, when executed by the processing circuitry, are configured to cause the processing circuitry to perform operations comprising:
receiving an SAK from the additional component;
encrypting data using the SAK; and
transmitting the encrypted data to the additional component.

* * * * *